United States Patent
Nagano (10) Patent No.: US 7,857,192 B2
(45) Date of Patent: Dec. 28, 2010

(54) FRICTION STIR WELDING TOOL AND FRICTION STIR WELDING METHOD

(75) Inventor: Yoshitaka Nagano, Oyama (JP)

(73) Assignee: Showa Denko K.K., Tokyo (JP)

( * ) Notice: Subject to any disclaimer, the term of this patent is extended or adjusted under 35 U.S.C. 154(b) by 205 days.

(21) Appl. No.: 12/224,992

(22) PCT Filed: Mar. 13, 2007

(86) PCT No.: PCT/JP2007/054968
§ 371 (c)(1),
(2), (4) Date: Sep. 11, 2008

(87) PCT Pub. No.: WO2007/119343
PCT Pub. Date: Oct. 25, 2007

(65) Prior Publication Data
US 2009/0072007 A1    Mar. 19, 2009

(30) Foreign Application Priority Data
Mar. 16, 2006    (JP) .............................. 2006-071983

(51) Int. Cl.
*B23K 31/02*    (2006.01)
(52) U.S. Cl. .................... 228/112.1; 228/2.1
(58) Field of Classification Search ............... 228/2.1, 228/112.1
See application file for complete search history.

(56) References Cited

U.S. PATENT DOCUMENTS 6,510,975 B2 *  1/2003  Enomoto .................. 228/112.1
2003/0192941 A1*  10/2003  Ishida et al. .............. 228/112.1

FOREIGN PATENT DOCUMENTS

| GB | 2306366 | 5/1997 |
|---|---|---|
| JP | 11-179568 | 7/1999 |
| JP | 11-197856 | 7/1999 |
| JP | 2000-246465 | 9/2000 |
| JP | 2001-269779 | 10/2001 |
| JP | 2001-340976 | 12/2001 |
| JP | 2002-001551 | 1/2002 |
| JP | 2002-248584 | 9/2002 |
| JP | 2003-001441 | 1/2003 |

OTHER PUBLICATIONS

Machine Translation of JP 2001-269779 which originally published Oct. 2001.*
International Search Report, Jun. 19, 2007, issued in PCT/JP2007-054968.

* cited by examiner

*Primary Examiner*—Jessica L Ward
*Assistant Examiner*—Nicholas P D'Aniello
(74) *Attorney, Agent, or Firm*—Edwards Angell Palmer & Dodge LLP (57) ABSTRACT

A friction stir welding tool 1 includes a rotor 2 to be attached to a rotation-drive section and a probe 3 concentrically provided on a distal end surface of the rotor 2. A provisional joining projection 4 is concentrically provided on a distal end surface of the probe 3. A relation $0.3\,D \leq d \leq 0.8\,D$ is satisfied, where D represents a diameter (mm) of the distal end surface of the probe 3, and d represents a diameter (mm) of the contour of a transverse cross section of the provisional joining projection 4. The provisional joining projection 4 has a length of 0.3 to 2 mm. This friction stir welding tool can improve the work efficiency of friction stir welding and can carry out friction stir welding which is excellent in welding quality after main friction stir welding.

13 Claims, 8 Drawing Sheets

FRICTION STIR WELDING TOOL AND FRICTION STIR WELDING METHOD

TECHNICAL FIELD

The present invention relates to a friction stir welding tool and a friction stir welding method.

BACKGROUND ART

In various industries such as the automobile industry, the shipbuilding industry, and the aerospace industry, the friction stir welding method, which is a solid-phase joining method, has been widely used, by virtue of its advantage that deformation or cracking caused by thermal strain is less likely to arise and the joining strength increases, as compared with the case of a melt welding process, such as TIG or MIG.

Incidentally, the friction stir welding method uses a friction stir welding tool which includes a cylindrical columnar rotor attached to a rotation-drive section, and a probe concentrically provided on a distal end surface of the rotor. The probe is plunged into a joint interface between two workpieces while being rotated, and the probe and the two workpieces are caused to undergo relative movement. Therefore, friction heat and relatively large pressure are applied to the workpieces. Accordingly, the workpieces move and deform at the time of joining, possibly generating joining defects, such as an internal defect of a joined portion and a form defect (e.g., misalignment). In order to prevent generation of such joining defects, the workpieces must be rigidly fixed during the joining.

However, a considerable difficulty arises when a base having a circular recess and a circular cover fitted into the recess and closing the opening of the recess are joined together by friction stir welding. Specifically, for such joining, the base having a circular recess is prepared along with the cover to be fitted into the recess and to close the opening of the recess. A stepped portion for receiving a circumferential edge portion of the cover is formed on the inner circumferential surface of the recess at an intermediate depth thereof. After the cover is fitted into the recess such that the circumferential edge portion thereof rests on the stepped portion of the recess, the base and the cover are joined together by means of the friction stir welding along a joint interface between a circumferential edge portion of the opening of the recess of the base and the circumferential edge portion of the cover. However, in such a case, it is extremely difficult to carry out the friction stir welding over the entire joint interface in a state where the base and the cover are firmly fixed.

In order to cope with the above problem, an improved method has been proposed (see Patent Document 1). In this method, when a cover is to be friction-stir-welded to a base as described above, the cover is provisionally and partially joined to the base by a general melt welding process or a friction stir welding process.

However, in the case where the cover is provisionally joined by a melt welding process according to the method disclosed in the Patent Document 1, a completely different apparatus must be used for such provisional joining, and the number of steps increases. Therefore, the work of joining the cover to the base is troublesome. Further, in the case where the cover is provisionally joined to the base at several points by a melt welding process, a blowhole, cracking, poor fusion, or a like defect is likely to arise. In order to avoid occurrence of such defect, preflow, treatment of craters, and the like must be sufficiently performed before main joining. This leads to an increase in the number of steps, thus impairing mass productivity.

Meanwhile, in the case where the cover is provisionally joined by a friction stir welding process, such provisional joining must be performed by use of a probe which is smaller in diameter than a probe used for main friction stir welding. However, for such provisional joining, the probe for provisional joining must be attached to the rotation-drive section of a friction stir welding apparatus so as to be replaced with the probe for main joining. Such probe exchange work is troublesome.

The present applicant has proposed a friction stir welding tool in which the probe is composed of a plurality of shaft portions having different diameters such that the diameter of the probe decreases stepwise toward the distal end thereof (see Patent Document 2). However, the friction stir welding tool disclosed in Patent Document 2 is designed to enable joining of a plurality of workpieces which differ in thickness at respective portions to be joined, and to secure a stable and high joining quality even when thick members are welded together. Therefore, the diameter ratio between the small diameter portion and the large diameter portion of the probe is not optimal for carrying out both the provisional friction stir welding and the main friction stir welding.

Patent Document 1: Japanese Patent Application Laid-Open (kokai) No. 2002-248584

Patent Document 2: Japanese Patent Application Laid-Open (kokai) No. 2000-246465

DISCLOSURE OF THE INVENTION

Problems to be Solved by the Invention

An object of the present invention is to solve the above problems and to provide a friction stir welding tool and a friction stir welding method which can improve the work efficiency of friction stir welding and can carry out friction stir welding which is excellent in welding quality after main friction stir welding.

Means for Solving the Problems

To achieve the above object, the present invention comprises the following modes.

1) A friction stir welding tool which includes a rotor to be attached to a rotation-drive section and a probe concentrically provided on a distal end surface of the rotor and which is used in such a manner that the probe is plunged into a joint interface between two workpieces while being rotated, and the two workpieces and the probe are moved relative to each other to thereby friction-stir-weld the two workpieces along the joint interface, wherein a projection for provisional joining is concentrically provided on a distal end surface of the probe, and a relation $0.3D \leq d \leq 0.8D$ is satisfied, where D represents a diameter (mm) of the distal end surface of the probe, and d represents a diameter (mm) of the contour of a transverse cross section of the projection for provisional joining.

2) A friction stir welding tool according to par. 1), wherein the projection for provisional joining has a length of 0.3 to 2 mm.

3) A friction stir welding tool according to par. 1) or 2), wherein the distal end surface of the probe is a flat surface or a partial-spherical concave surface.

4) A friction stir welding tool according to any of pars. 1) to 3), wherein the probe has a cylindrical columnar shape.

5) A friction stir welding tool according to any of pars. 1) to 3), wherein the probe has a conical shape so that the diameter of the probe decreases toward the distal end thereof.

6) A friction stir welding tool according to any of pars. 1) to 5), wherein a thread ridge is formed on an outer circumferential surface of the probe, and is not formed on an outer circumferential surface of the projection for provisional joining.

7) A friction stir welding tool according to any of pars. 1) to 6), wherein a distal end surface of the projection for provisional joining is a partial-spherical convex surface.

8) A friction stir welding tool according to any of pars. 1) to 7), wherein the projection for provisional joining has a transverse cross section of an irregular shape, and has, on its outer circumferential surface, a plurality of partial cylindrical surfaces formed such that the partial cylindrical surfaces are located in a common cylindrical plane and are separated from one another in the circumferential direction.

9) A friction stir welding method characterized by comprising:

performing provisional friction stir welding in such a manner that, while the rotor of a friction stir welding tool according to any one of pars. 1) to 8) is rotated, the projection for provisional joining is plunged into a joint interface between two workpieces such that the projection engages the two workpieces, and the two workpieces and the friction stir welding tool are moved relative to each other so as to intermittently weld the two workpieces along the joint interface by use of the projection for provisional joining; and subsequently performing main friction stir welding in such a manner that, while the rotor of the friction stir welding tool is rotated, the probe is plunged into the joint interface such that the probe engages the two workpieces, and the two workpieces and the friction stir welding tool are moved relative to each other so as to continuously weld the two workpieces along the entire joint interface by use of the probe.

10) A friction stir welding method according to par. 9), wherein a relation $(L1-0.05) \leq Z \leq (L1+0.15)$ is satisfied when the provisional friction stir welding is performed, and a relation $(L2-0.05) \leq Z \leq (L2+0.3)$ is satisfied when the main friction stir welding is performed, where L1 represents a length (mm) of the projection for provisional joining, L2 represents a total length (mm) of the probe and the projection for provisional joining, and Z represents a plunged depth (mm) of the distal end of the projection for provisional joining as measured from the surfaces of the workpieces.

11) A friction stir welding method according to par. 9) or 10), wherein each of joined portions formed by the provisional friction stir welding has length equal to or greater than the diameter of the distal end surface of the probe of the friction stir welding tool.

12) A friction stir welding method according to any of pars. 9) to 11), wherein the joint interface between the two workpieces is straight, and the provisional friction stir welding is performed such that each of unjoined portions has a length equal to or less than 300 mm.

13) A friction stir welding method according to any of pars. 9) to 11), wherein the joint interface between the two workpieces includes an arcuate portion, and the provisional friction stir welding is performed such that each of unjoined portions has a length equal to or less than three times the radius of the arcuate portion.

14) A friction stir welding method according to par. 13), wherein the joint interface between the two workpieces has an endless shape.

EFFECTS OF THE INVENTION

When friction stir welding is performed by use of the friction stir welding tool according to par. 1), provisional friction stir welding is first performed, and main friction stir welding is then performed. The provisional friction stir welding is performed in such a manner that, while the rotor of the friction stir welding tool according to any one of pars. 1) to 8) is rotated, the projection for provisional joining is plunged into a joint interface between two workpieces such that the projection engages the two workpieces, and the two workpieces and the friction stir welding tool are moved relative to each other so as to intermittently weld the two workpieces along the joint interface by use of the projection for provisional joining. The main friction stir welding is performed in such a manner that, while the rotor of the friction stir welding tool is rotated, the probe is plunged into the joint interface such that the probe engages the two workpieces, and the two workpieces and the friction stir welding tool are moved relative to each other so as to continuously weld the two workpieces along the entire joint interface by use of the probe. Further, the projection for provisional joining is concentrically provided on the distal end surface of the probe of the friction stir welding tool, and a relation $0.3\,D \leq d \leq 0.8\,D$ is satisfied, where D represents the diameter (mm) of the distal end surface of the probe, and d represents the diameter (mm) of the contour of the distal end surface of the projection for provisional joining. Therefore, the joining strength of each of joined portions formed by the provisional friction stir welding increases, and breakage of the joined portions during the subsequent main friction stir welding can be prevented. Accordingly, generation of joining defects, such as an internal defect of a joined portion and a form defect (e.g., misalignment) can be prevented. Further, the friction stir welding tool is not required to be exchanged with another friction stir welding tool having a different probe diameter between performance of the provisional friction stir welding and performance of the main friction stir welding. Therefore, work efficiency is improved. In addition, a plurality of friction stir welding tools are not required to be prepared, facility cost can be reduced.

According to the friction stir welding tool of par. 3), well-joined portions are obtained when the provisional friction stir welding is performed.

According to the friction stir welding tool of par. 5), the load which the probe receives from the workpieces during the main friction stir welding is reduced, whereby the service life of the probe is improved.

According to the friction stir welding tool of par. 7), the load acting on the projection for provisional joining when the projection for provisional joining is plunged into the workpieces is reduced, whereby the service lives of the projection for provisional joining and the probe are improved.

According to the friction stir welding tool of par. 8), the material stirring force during the provisional friction stir welding increases, whereby the speed of the provisional friction stir welding can be increased.

According to the friction stir welding method of par. 9), the joining strength of each of joined portions formed by the provisional friction stir welding increases, and breakage of the joined portions during the subsequent main friction stir welding can be prevented. Accordingly, generation of joining defects, such as an internal defect of a joined portion and a form defect (e.g., misalignment) can be prevented.

According to the friction stir welding method of par. 10), well-joined portions which are free from joining defects, such as an internal defect of a joined portion and a form defect (e.g., misalignment), can be obtained.

In the case where the joint interface between the two workpieces has an endless shape as in the friction stir welding method of par. 14), it is very difficult to friction-stir-weld the workpieces along the entire joint interface in a state in which the workpieces are firmly fixed. However, even in such a case, the method of par. 9) enables the workpieces to be joined together relatively easily.

BEST MODE FOR CARRYING OUT THE INVENTION

Embodiments of the present invention will next be described with reference to the drawings.

Figure 1:
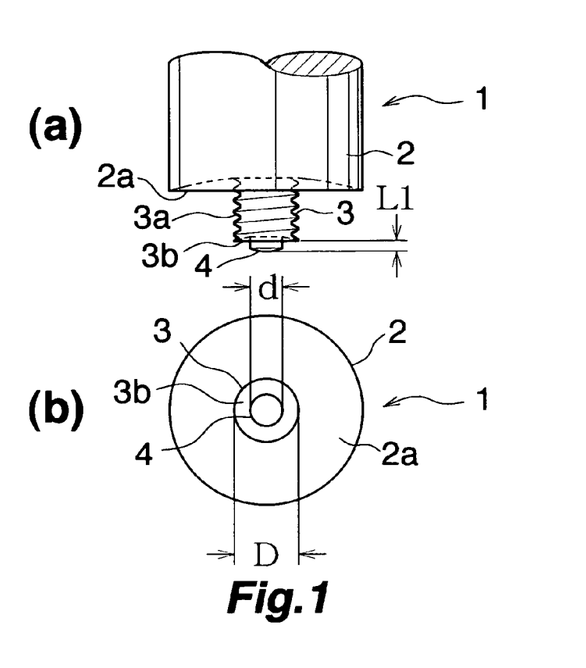
FIG. 1 shows a first embodiment of the friction stir welding tool according to the present invention, wherein (a) is an enlarged partial front view, and (b) is a bottom view.

FIG. 1 shows a first embodiment of the friction stir welding tool according to the present invention.

In FIG. 1, a friction stir welding tool (1) includes a rotor (2) which is attached to a rotation-drive section (not shown) of a friction stir welding apparatus and has a cylindrical columnar distal end portion; a cylindrical columnar probe (3) concentrically and integrally formed on a distal end surface of the rotor (2); and a cylindrical columnar provisional joining projection (4) concentrically and integrally formed on a distal end surface of the probe (3).

The distal end surfaces of the rotor (2) and the probe (3) each have a partial-spherical concave surface. Further, a thread ridge (3a) is formed on the outer circumferential surface of the probe (3). No thread ridge is formed on the outer circumferential surface of the provisional joining projection (4). Notably, a thread ridge may be formed on the outer circumferential surface of the provisional joining projection (4). The distal end surface of the provisional joining projection (4) has a partial-spherical convex surface. The rotor (2), the probe (3), and the provisional joining projection (4) are formed of a material which is harder than workpieces to be joined by use of the tool (1) and has a heat resistance sufficient for enduring friction heat generated in the course of joining.

When the diameter of the distal end surface of the probe (3) is represented by D (mm) and the diameter of the contour of a transverse cross section of the provisional joining projection (4) is represented by d (mm), a relation $0.3\,D \leq d \leq 0.8\,D$ must be satisfied. When $d<3D$, the diameter of the distal end surface of the provisional joining projection (4) becomes excessively small, and a joining strength attained through provisional friction stir welding to be described later decreases. When $d>8D$, the area of a portion of the front end surface of the probe (3), the portion surrounding the provisional joining projection (4) becomes insufficient, and a pressing force applied from the front end surface of the probe (3) to the workpieces becomes insufficient, whereby the joining strength attained through the provisional friction stir welding to be described later decreases. In either case, joined portions formed by the provisional friction stir welding break during main friction stir welding to be described later. Therefore, joining defects, such as an internal defect of a joined portion and a form defect (e.g., misalignment), are generated. Notably, in this embodiment, since the thread ridge (3a) is formed on the outer circumferential surface of the probe (3), the diameter D of the distal end surface is equal to the outer diameter of the external thread.

Preferably, the length (L1) of the provisional joining projection (4) falls within a range of 0.3 mm to 2 mm. When the length (L1) of the provisional joining projection (4) is less than 0.3 mm, a generated friction stirring force is weak, and the strength attained through the provisional friction stir welding may be insufficient. When the length (L1) of the provisional joining projection (4) exceeds 2 mm, the strength attained through the provisional friction stir welding becomes excessive, which is uneconomical. In the present embodiment, the distal end surface of the probe (3) has a partial-spherical concave shape. In such a case, the length (L1) of the provisional joining projection (4) refers to a distance between the outer circumferential edge of the distal end surface of the probe (3) and the distal end of the provisional joining projection (4) (see FIG. 1(a)). Notably, when the distal end surface of the probe (3) is flat, needless to say, the length (L1) of the provisional joining projection (4) is a distance between the flat distal end surface and the distal end of the provisional joining projection (4).

Next, a method of friction-stir-welding a base having a recess and a cover fitted into the recess and closing the opening of the recess by use of the above-described friction stir welding tool (1) will be described with reference to FIGS. 2 to 9.

Figure 2:
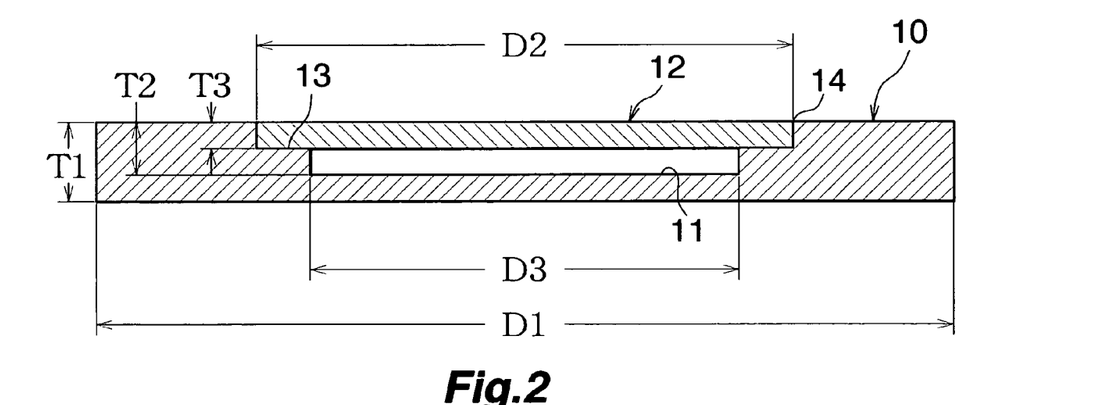
FIG. 2 is a vertical sectional view showing a base and a cover to be joined by the friction stir welding tool of FIG. 1.

First, as shown in FIG. 2, there are prepared a base (10) having a recess (11) which is circular as viewed from above, and a circular cover (12) which is fitted into the recess (11) and adapted to close the opening of the recess (11). A stepped portion (13), which projects radially inward, is formed on the inner circumferential surface of the recess (11) of the base (10) at a portion located on the bottom side. The thickness of the cover (12) is smaller than the overall depth of the recess (11) and is equal to the depth of a portion of the recess (11) located above the stepped portion (13). The diameter of the cover (12) is equal to or slightly smaller than the diameter of the opening of the recess; i.e., the diameter of the recess (11) as measured above the stepped portion (13).

Each of the base (10) and the cover (12) is formed from, for example, any one of JIS A2000-family alloys, JIS A5000-family alloys, JIS A6000-family alloys, and JIS A7000-family alloys. The base (10) and the cover (12) may be formed from the same material or from different materials.

When the base (10) and the cover (12) are joined together by means of friction stir welding, the base (10) is first placed on an unillustrated worktable. Subsequently, the cover (12) is fitted into the recess (11) of the base (10) such that a circumferential portion thereof rests on the stepped portion (13), thereby making the upper surface of a portion of the base (10) around the recess (11) and an upper surface of the cover (12) flush with each other. An annular joint interface (14) is formed between a circumferential edge portion of the opening of the recess (11) of the base (10) and a circumferential edge portion of the cover (12).

Figure 5:
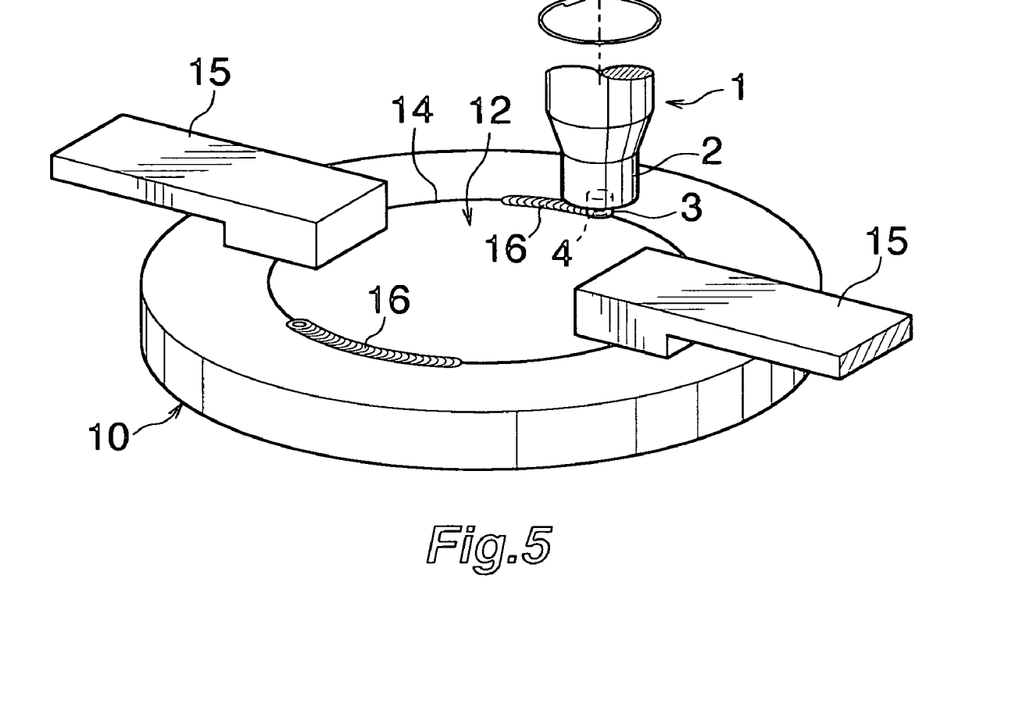
FIG. 5 is a perspective view showing the state in which the base and the cover are joined along the joint interface through the provisional friction stir welding by use of the friction stir welding tool of FIG. 1.

Subsequently, the base (10) and the cover (12) are clamped to the worktable by simultaneously pressing them by a plurality of clamp jigs (15) (see FIG. 5).

Figure 3:
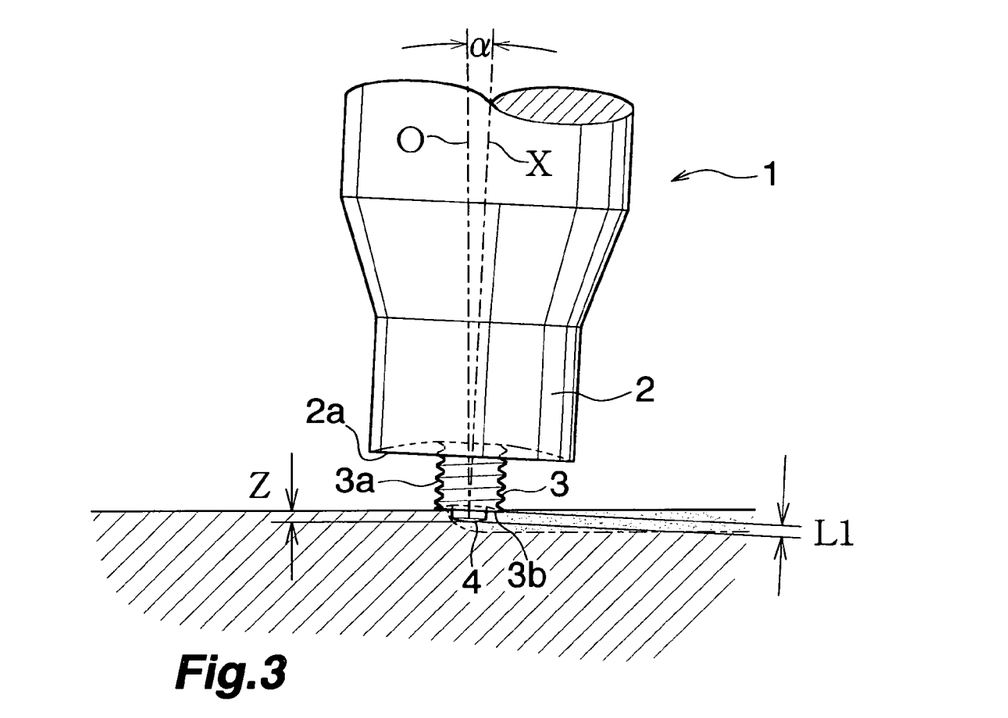
FIG. 3 is an enlarged partial vertical sectional view showing a state in which the base and the cover are joined along a joint interface through provisional friction stir welding by use of the friction stir welding tool of FIG. 1.
Figure 4:
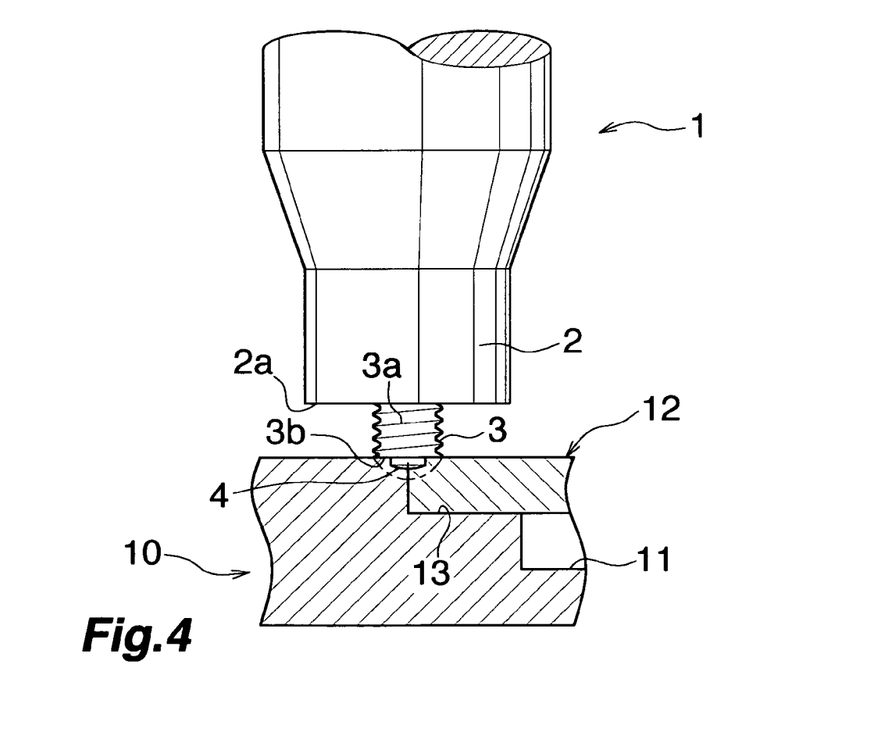
FIG. 4 is an enlarged partial vertical sectional view showing the same state as FIG. 3, as viewed from a direction different from that of FIG. 3.

Next, while the rotor (2) of the friction stir welding tool (1) is rotated, the provisional joining projection (4) of the friction stir welding tool (1) is plunged into the joint interface (14) at a circumferential position where the provisional joining projection (4) does not interfere with the clamp jigs (15), so that the provisional joining projection (4) engages both the circumferential edge portion of the opening of the recess (11) of the base (10) and the circumferential edge portion of the cover (12). Simultaneously, a shoulder portion (3b) of the distal end surface of the probe (3) surrounding the provisional joining projection (4) is pressed against the upper surfaces of the base (10) and the cover (12) (see FIGS. 3 and 4). Here, as shown in FIG. 3, the length of the provisional joining projection (4) is represented by L1 (mm), and a plunged depth of the distal end of the provisional joining projection (4) as measured from the upper surfaces of the base (10) and the cover (12) is represented by Z (mm). In this case, preferably, a relation (L1–

$0.05) \leq Z \leq (L1+0.15)$ is satisfied. When $Z<(L1-0.05)$, the pressing force of the shoulder portion (3b) becomes insufficient, and well-joined portions may fail to be obtained. When $Z>(L1+0.15)$, the pressing amount of the shoulder portion (3b) becomes excessive, and well-joined portions may fail to be obtained.

Next, while the rotor (2) is rotated, the probe (3) and the provisional joining projection (4) are moved over a predetermined distance along the annular joint interface (14) through relative movement between the base (10) and the cover (12) and the friction stir welding tool (1), to thereby friction-stir-weld the base (10) and the cover (12) over a predetermined distance. Subsequently, the provisional joining projection (4) is withdrawn from the base (10) and the cover (12). This operation is repeated a plurality of times along the joint interface (14) at predetermined intervals, whereby the base (10) and the cover (12) are intermittently welded along the joint interface (14) (provisional friction stir welding). When the probe (3) and the provisional joining projection (4) are moved in the circumferential direction along the joint interface (14), the axis (X) of the rotor (2) of the friction stir welding tool (1) is tilted slightly rearward from the vertical position with respect to the travel direction. The tilt angle of the axis (X) of the rotor (2) in relation to a vertical line (0) is referred to as an advance angle ($\alpha$) (see FIG. 3).

Figure 6:
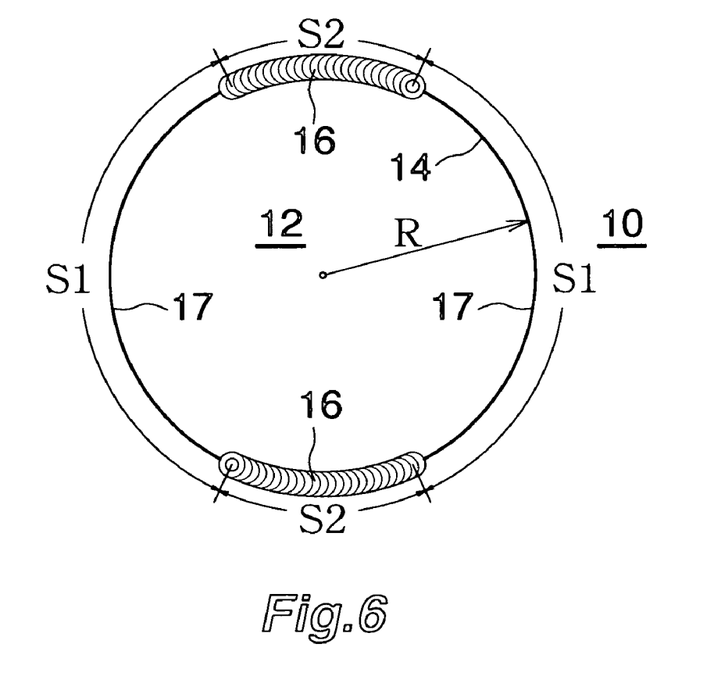
FIG. 6 is a schematic plan view showing a state in which the base and the cover have been joined along the joint interface through the provisional friction stir welding by use of the friction stir welding tool of FIG. 1.

Preferably, the length of each joined portion (16) formed through the provisional friction stir welding (hereinafter referred to as the "provisionally welded portion (16)") is set to be equal to or greater than the diameter (D) of the distal end surface of the probe (3) of the friction stir welding tool (1). When the length of the provisionally welded portion (16) is less than the diameter (D) of the distal end surface of the probe (3), this means that the friction stirring force generated in the course of the provisional friction stir welding was insufficient, and the strength of the provisionally welded portion (16) may be insufficient. Since the joint interface (14) between the base (10) and the cover (12) has an annular shape as shown in FIG. 6, preferably, the length (S1) (mm) of each unjoined portion (17) where the provisional friction stir welding is not performed is set to be equal to or less than three times the radius (R) (mm) of the joint interface (14). When the length (S1) of the unjoined portion (S1) exceeds three times the radius (R) of the joint interface (14), the provisional joining becomes insufficient, and joining defects, such as an internal defect of a joined portion and a form defect (e.g., misalignment), may be generated after the main friction stir welding. Notably, the length (S2) of the provisionally welded portion (16) is a distance between a point at which the provisional joining projection (4) is plunged and a point at which the provisional joining projection (4) is withdrawn; i.e., the moving distance of the provisional joining projection (4). The length (S1) of the unjoined portion (17) is a distance between a point at which the provisional joining projection (4) is withdrawn at the end of the previous operation and a point at which the provisional joining projection (4) is plunged at the start of the subsequent operation.

Subsequently, the clamping of the base (10) and the cover (12) to the worktable by the clamp jigs (15) is temporarily released, and the base (10) and the cover (12) are clamped to the worktable by pressing only the base (10) by the clamp jigs (15).

Figure 7:
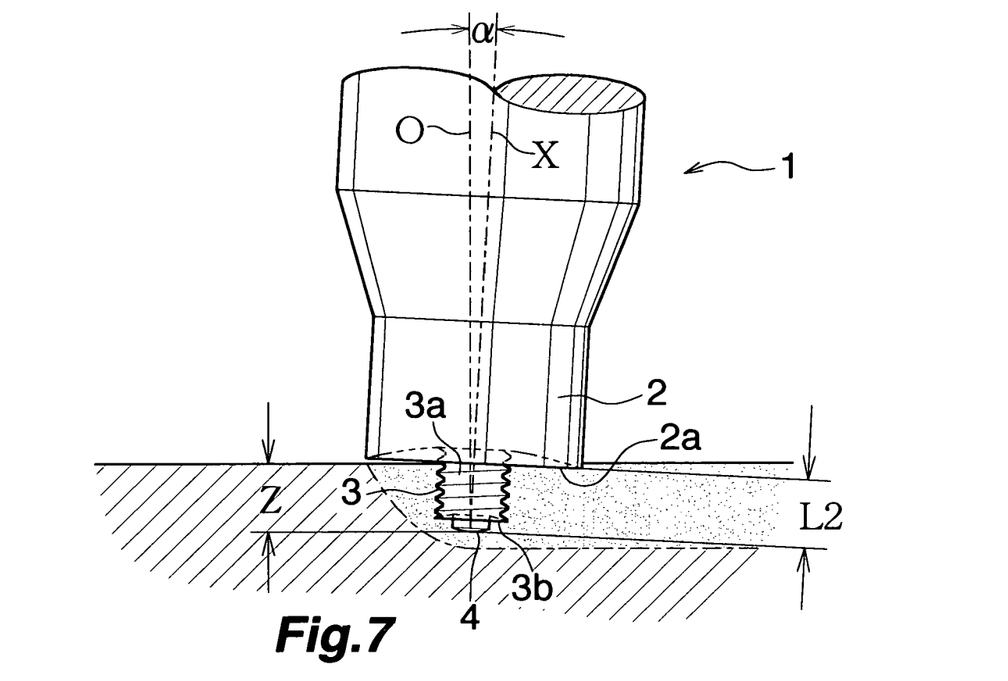
FIG. 7 is an enlarged partial vertical sectional view showing a state in which the base and the cover are joined along the joint interface through main friction stir welding by use of the friction stir welding tool of FIG. 1.
Figure 8:
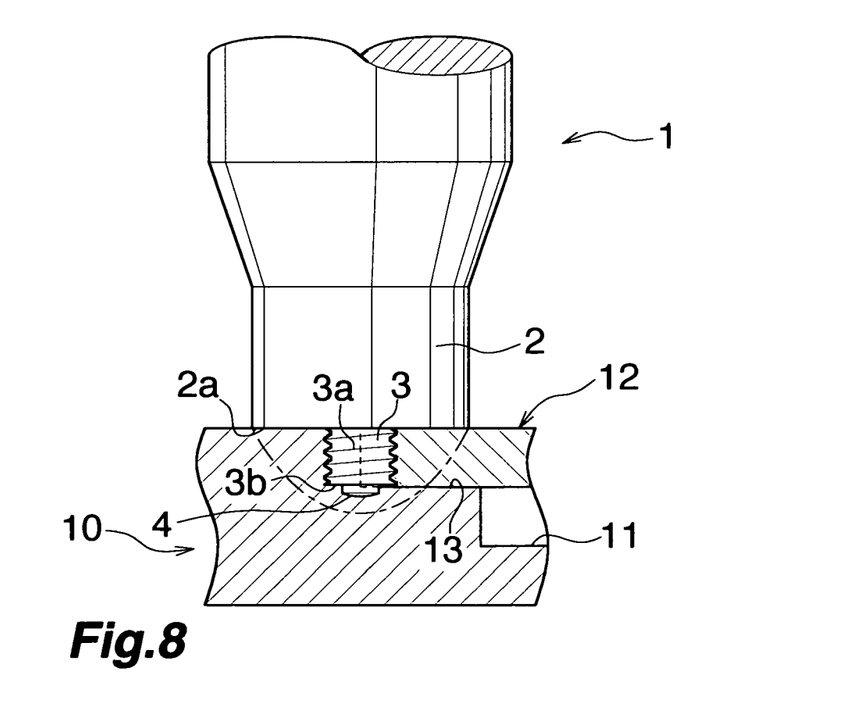
FIG. 8 is an enlarged partial vertical sectional view showing the same state as FIG. 7, as viewed from a direction different from that of FIG. 7.

After that, while the rotor (2) of the friction stir welding tool (1) is rotated, the probe (3) of the friction stir welding tool (1) is plunged into the joint interface (14) at a circumferential position where the probe (3) does not interfere with the clamp jigs (15), so that the probe (3) engages both the circumferential edge portion of the opening of the recess (11) of the base (10) and the circumferential edge portion of the cover (12). Simultaneously, a shoulder portion (2a) of the distal end surface of the rotor (2) surrounding the probe (3) is pressed against the upper surfaces of the upper surfaces of the base (10) and the cover (12) (see FIGS. 7 and 8). Here, as shown in FIG. 7, the total length of the probe (3) and the provisional joining projection (4) is represented by L2 (mm), and the plunged depth of the distal end of the provisional joining projection (4) as measured from the upper surfaces of the base (10) and the cover (12) is represented by Z (mm). In this case, preferably, a relation $(L2-0.05) \leq Z \leq (L2+0.3)$ is satisfied. When $Z<(L2-0.05)$, the pressing force of the shoulder portion (2a) becomes insufficient, and well-joined portions may fail to be obtained. When $Z>(L2+0.3)$, the pressing amount of the shoulder portion (2a) becomes excessive, and well-joined portions may fail to be obtained. Notably, in the present embodiment, the distal end surface of the rotor (2) has a partial-spherical concave shape. In such a case, the total length (L2) of the probe (3) and the provisional joining projection (4) refers to a distance between the outer circumferential edge of the distal end surface of the rotor (2) and the distal end of the provisional joining projection (4). Notably, when the distal end surface of the rotor (2) is flat, needless to say, the total length (L2) of the probe (3) and the provisional joining projection (4) is a distance between the flat distal end surface and the distal end of the provisional joining projection (4).

Figure 9:
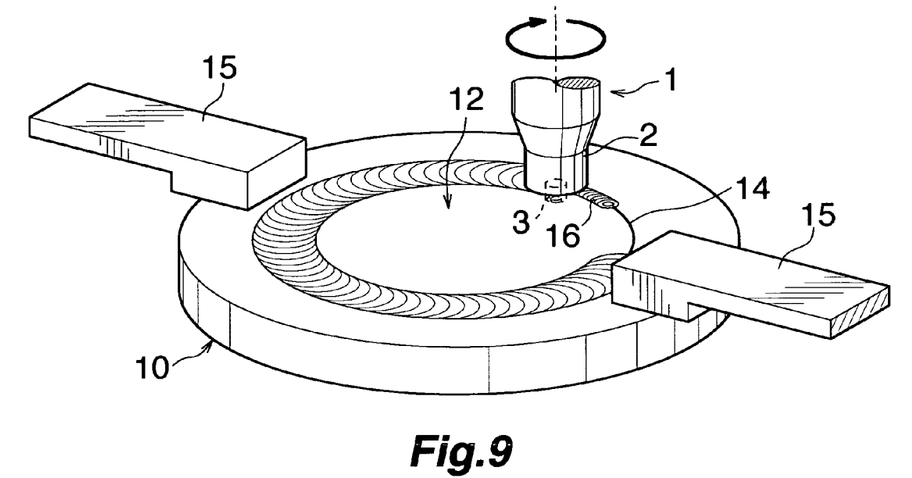
FIG. 9 is a perspective view showing the state in which the base and the cover are joined along the joint interface through the main friction stir welding by use of the friction stir welding tool of FIG. 1.

Next, while the rotor (2) is rotated, the probe (3) is moved over the entire joint interface (14) through relative movement between the base (10) and the cover (12) and the friction stir welding tool (1), to thereby continuously friction-stir-weld the base (10) and the cover (12) over the entire circumference (main friction stir welding) (see FIG. 9). Notably, as in the case of the provisional friction stir welding, when the probe (3) is moved in the circumferential direction along the joint interface (14) for carrying out the main friction stir welding, the axis (X) of the rotor (2) of the friction stir welding tool (1) is tilted slightly rearward from the vertical position with respect to the travel direction, so that the rotor (2) has the advance angle ($\alpha$) in relation to the vertical line (0) (see FIG. 7).

The base (10) and the cover (12) are thus friction-stir-welded together.

Next, Examples in which the base (10) and the cover (12) are friction-stir-welded together by the method shown in FIGS. 2 and 9 and by use of the friction stir welding tool (1) of the first embodiment will be described together with Comparative Examples.

Examples 1 to 3

Three types of friction stir welding tools (1) were prepared. These friction stir welding tools (1) were formed such that the diameter of the shoulder portion (2a) of the distal end surface of the rotor (2): 18 mm; the diameter (D) of the distal end surface of the probe (3): 6 mm; the length (L2-L1) of the probe (3): 10 mm; the length (L1) of the provisional joining projection (4): 1 mm; the total length (L2) of the probe (3) and the provisional joining projection (4): 4.8 mm; and the diameter (d) of the contour of a transverse cross section of the provisional joining projection (4): 1.8 mm, 3 mm, and 4.8 mm, respectively.

Further, the base (10) and the cover (12) formed from JIS A6061-T6 were prepared. As shown in FIG. 2, the outside diameter (D1) of the base (10): 160 mm; thickness (T1) of the base (10): 15 mm; the total depth (T2) of the recess (11): 10 mm; the depth (T3) of the recess (2) as measured above the stepped portion (4): 5 mm; the diameter (D2) of the recess (2) as measured above the stepped portion (4) (=the diameter of the opening of the recess): 100.1 mm; the diameter (D3) of the recess (2) as measured below the stepped portion (4): 80 mm; the thickness of the cover (12) (=the depth of the recess (2) as measured above the stepped portion (4)): 5 mm; and the diameter of the cover (12): 99.9 mm.

The base (10) and the cover (12) were clamped to a worktable by simultaneously pressing the base (10) and the cover (12) by the clamp jigs (15) at two locations on a diametrical line thereof. Subsequently, at two locations between the clamp jigs (15), the base (10) and the cover (12) were provisionally welded in the same manner as in the above-described first embodiment by use of each of the three types of the friction stir welding tools (1) such that the length (S2) of the provisionally joined portion (16) became 60 mm (provisional friction stir welding). After that, the clamping of the base (10) and the cover (12) to the worktable by the clamp jigs (15) was temporarily released, and the base (10) and the cover (12) were clamped to the worktable by pressing only the base (10) by the clamp jigs (15). Subsequently, by use of each of the three types of the friction stir welding tools (1), the base (10) and the cover (12) were welded along the entire joint interface (14) in the same manner as described above (main friction stir welding).

The conditions of the provisional friction stir welding are such that the advance angle (α): 3 degrees; the rotational speed of the rotor (2): 2000 rpm; the plunged depth (Z) of the distal end of the provisional joining projection (4) as measured from the upper surfaces of the base (10) and the cover (12): 1 mm; and the joining speed: 300 mm/min. The conditions of the main friction stir welding are such that the advance angle (α): 3 degrees; the rotational speed of the rotor (2): 1500 rpm; the plunged depth (Z) of the distal end of the provisional joining projection (4) as measured from the upper surfaces of the base (10) and the cover (12): 4.9 mm; and the joining speed: 300 mm/min.

Comparative Examples 1 and 2

The base (10) and the cover (12) were friction-stir-welded under the same conditions as those in Examples 1 to 3, except that the used friction stir welding tools have provisional joining projections whose diameters are 1.2 mm and 5.4 mm, respectively.

Figure 10:
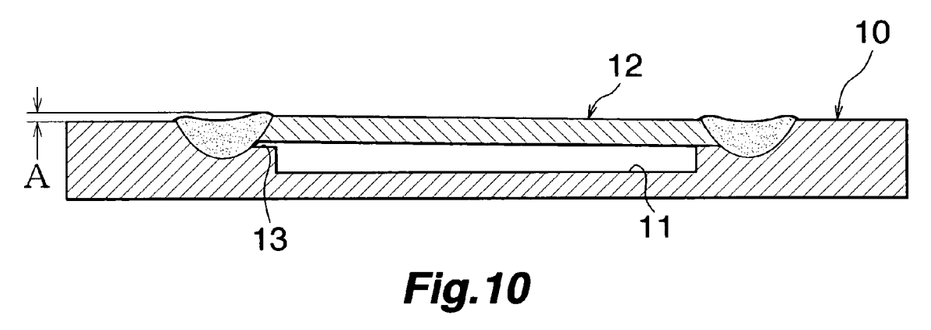
FIG. 10 is a vertical sectional view showing a misalignment measured in the evaluation test for the base and the cover joined in each of Examples and Comparative Examples.

Evaluation Test:

The misalignment (A) (see FIG. 10) between the base (10) and the cover (12) which were friction-stir-welded in each of Examples 1 to 3 and Comparative Examples 1 and 2 was measured. Table 1 shows the results of the measurement.

TABLE 1

|  | d (mm) | Ratio of d to D | Misalignment (mm) |
| --- | --- | --- | --- |
| Example 1 | 1.8 | d = 0.3 D | 0.1 or less |
| Example 2 | 3.0 | d = 0.5 D | 0.1 or less |
| Example 3 | 4.8 | d = 0.8 D | 0.1 or less |
| Comparative Example 1 | 1.2 | d = 0.2 D | 1.3 |
| Comparative Example 2 | 5.4 | d = 0.9 D | 1.2 |

Note:
d: the diameter of the contour of a transverse cross section of the provisional joining projection
D: the diameter of the distal end surface of the probe As is apparent from Table 1, in the case of Examples 1 to 3, in which the diameter (D) of the distal end surface of the probe (3) and the diameter (d) of the contour of a transverse cross section of the provisional joining projection (4) satisfy the relation 0.3 D≦d≦0.8 D, misalignment was hardly generated. In contrast, in Comparative Example 1 in which d<0.3 D and in Comparative Example 2 in which d>0.8 D, a large misalignment was generated. That is, when d<0.3 D, the diameter of the distal end surface of the provisional joining projection (4) becomes excessively small, and the stirring force at the time of the provisional friction stir welding becomes insufficient, so that the joining strength decreases. When d>8 D, the area of the distal end surface of the probe (3) becomes insufficient, and the pressing force applied from the distal end surface of the probe (3) to the workpieces becomes insufficient, so that the joining strength at the time of the provisional friction stir welding decreases. In either case, conceivably, due to insufficiency of the joining strength at the time of the provisional friction stir welding, the provisionally welded portion broke during the main friction stir welding, and the cover (12) lifted, whereby a large misalignment was generated.

Figure 11:
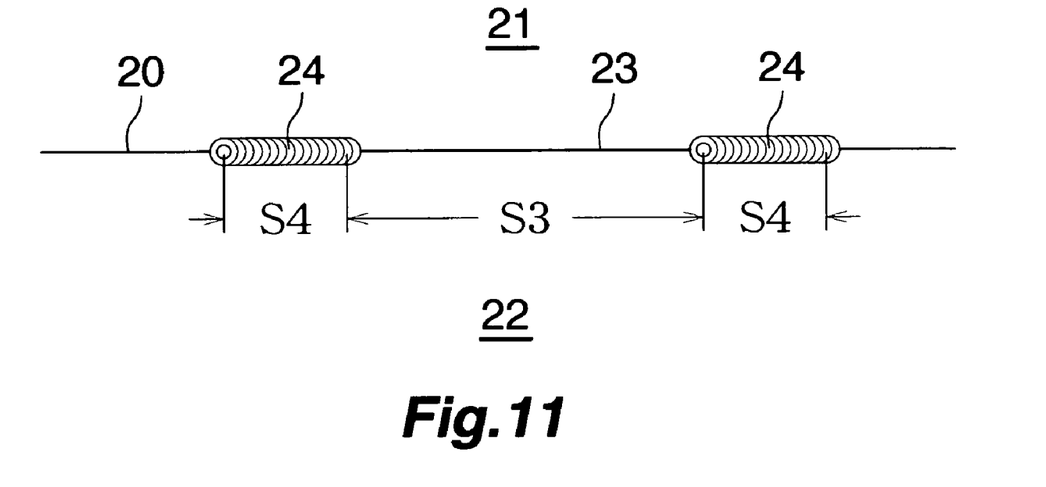
FIG. 11 is a schematic plan view showing another example of the friction stir welding method using the friction stir welding tool and showing a state in which two workpieces have been joined through provisional friction stir welding.
Figure 12:
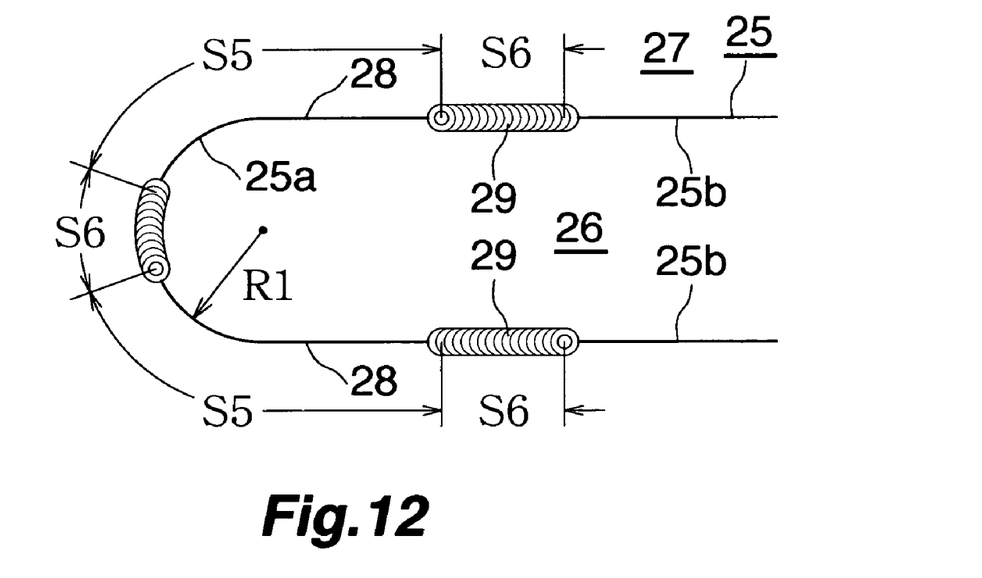
FIG. 12 is a schematic plan view showing still another example of the friction stir welding method using the friction stir welding tool and showing a state in which two workpieces have been joined through provisional friction stir welding.

FIGS. 11 and 12 show other examples of the friction stir welding method which uses the friction stir welding tool (1).

The method sown in FIG. 11 is a method for friction-stir-welding two workpieces (21) and (22) which are combined to form a straight joint interface (20) therebetween. In the case of this method, preferably, the provisional friction stir welding is performed such that the length (S3) of an unjoined portion (23) becomes 300 mm or less, because of the following reasons. When the length (S3) of the unjoined portion (23) exceeds 300 mm, the provisional joining becomes insufficient, and joining defects, such as an internal defect of a joined portion and a form defect (e.g., misalignment), may be generated after the main friction stir welding. Further, for the same reason as described above, preferably, the length (S4) of each provisionally joined portion (24) is set to be equal to or greater than the diameter (D) of the distal end surface of the probe (3) of the friction stir welding tool (1). Other conditions are identical with those of the above-described method shown in FIGS. 2 to 9.

The method sown in FIG. 12 is a method for friction-stir-welding two workpieces (26) and (27) which are combined such that a joint interface (25) therebetween includes a semicircular portion (25a) and two straight portions (25b) extending from opposite ends of the semicircular portion (25a). In the case of this method, preferably, the provisional friction stir welding is performed such that the length (S5) of each unjoined portion (28) becomes equal to or less than three times the radius (R1) of the semicircular portion (25a), for the same reason as described above. Further, preferably, the length (S6) of each provisionally joined portion (29) is set to be equal to or greater than the diameter (D) of the distal end surface of the probe (3) of the friction stir welding tool (1). Other conditions are identical with those of the above-described method shown in FIGS. 2 to 9.

Figure 13:
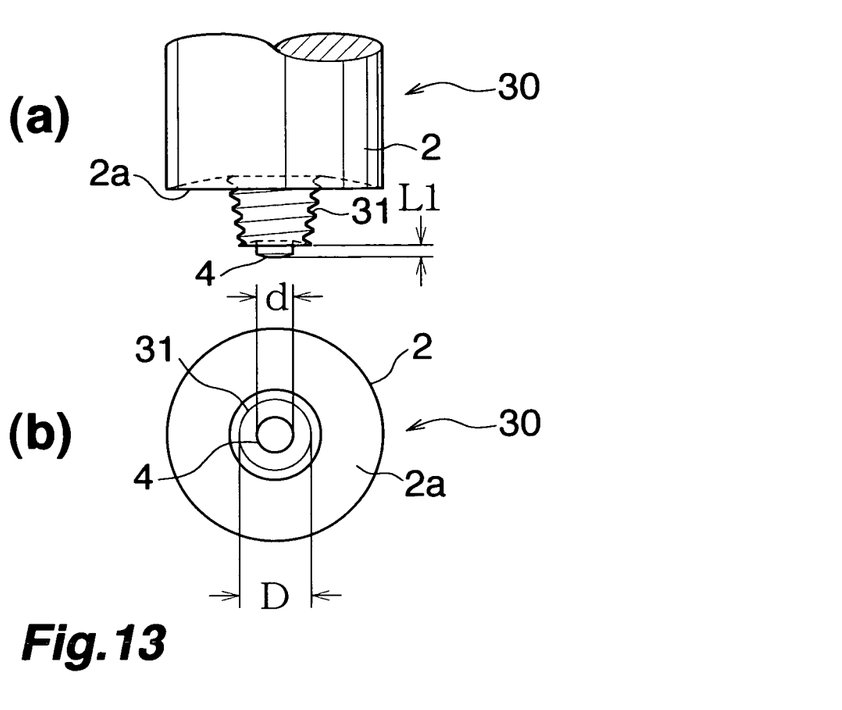
FIG. 13 shows a second embodiment of the friction stir welding tool according to the present invention, wherein (a) is an enlarged partial front view, and (b) is a bottom view.
Figure 14:
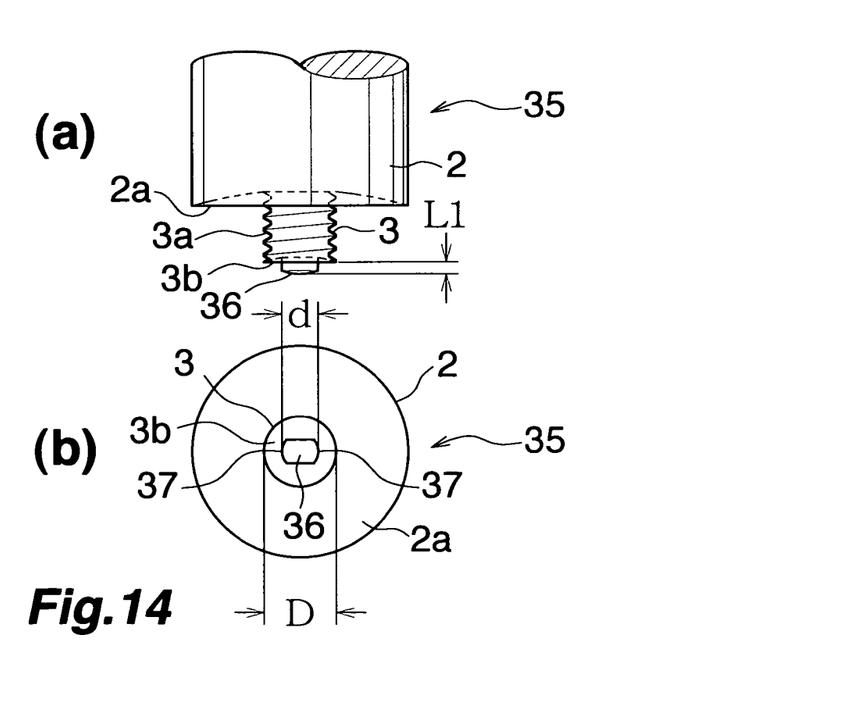
FIG. 14 shows a third embodiment of the friction stir welding tool according to the present invention, wherein (a) is an enlarged partial front view, and (b) is a bottom view.
Figure 15:
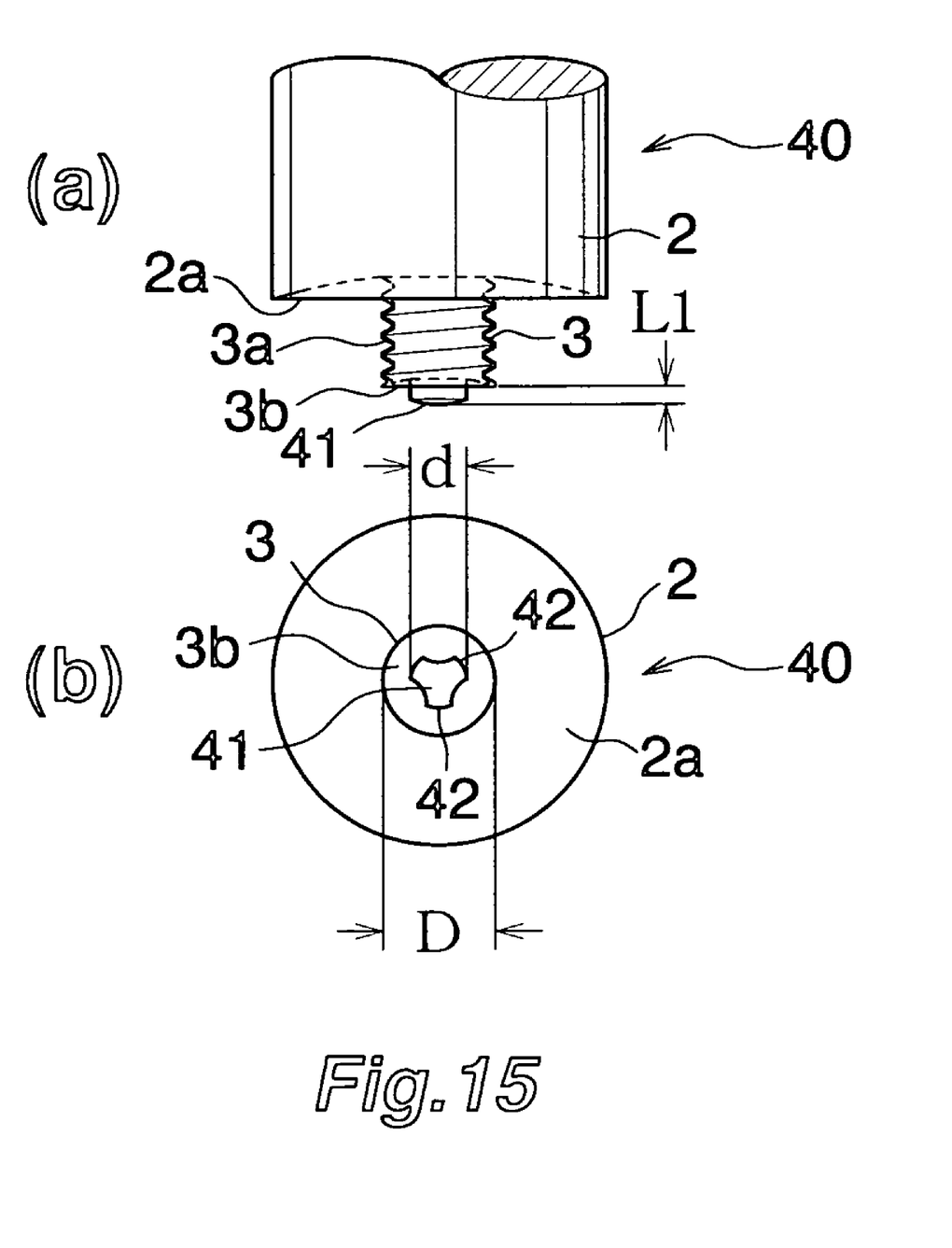
FIG. 15 shows a fourth embodiment of the friction stir welding tool according to the present invention, wherein (a) is an enlarged partial front view, and (b) is a bottom view.

FIGS. 13 to 15 show second to fourth embodiments of the friction stir welding tool.

In the case of a friction stir welding tool (30) of the second embodiment shown in FIG. 13, its probe (31) has a conical shape such that the diameter of the probe decreases toward the distal end thereof.

In the case of a friction stir welding tool (35) of the third embodiment shown in FIG. 14, its provisional joining projection (36) has an irregular transverse cross section, and the provisional joining projection (36) has, on its outer circumferential surface, a plurality of (two in this embodiment)

partial cylindrical surfaces (37) formed such that the partial cylindrical surfaces (37) are located in a common cylindrical plane and are separated from one another in the circumferential direction.

In the case of a friction stir welding tool (40) of the fourth embodiment shown in FIG. 15, its provisional joining projection (41) has an irregular transverse cross section, and the provisional joining projection (41) has, on its outer circumferential surface, a plurality of (three in this embodiment) partial cylindrical surfaces (42) formed such that the partial cylindrical surfaces (42) are located in a common cylindrical plane and are separated from one another in the circumferential direction.

In the friction stir welding tools (35) and (40) of the third and fourth embodiments, the diameter (d) of the contour of a transverse cross section of the provisional joining projection (36), (41) refers to the diameter of the cylindrical plane in which the partial cylindrical surfaces (37), (42) are located.

Other structural features of the friction stir welding tools (30), (35), and (40) shown in FIGS. 13 to 15 are identical with those of the friction stir welding tool (1) of the first embodiment.

INDUSTRIAL APPLICABILITY

The friction stir welding tool according to the present invention is preferably used for joining two workpieces by provisional friction stir welding and then main friction stir welding in various industries.

The invention claimed is:

1. A friction stir welding method comprising the steps of:
providing a friction stir welding tool which includes a rotor to be attached to a rotation-drive section and a probe concentrically provided on a distal end surface of the rotor and which is used in such a manner that the probe is plunged into a joint interface between two workpieces while being rotated, and the two workpieces and the probe are moved relative to each other to thereby friction-stir-weld the two workpieces along the joint interface, wherein a projection for provisional joining is concentrically provided on a distal end surface of the probe, and a relation $0.3D \leq d \leq 0.8D$ is satisfied, where D represents a diameter (mm) of the distal end surface of the probe, and d represents a diameter (mm) of the contour of a transverse cross section of the projection for provisional joining performing provisional friction stir welding in such a manner that, while the rotor of the friction stir welding tool is rotated only, the projection for provisional joining is plunged into a joint interface between two workpieces such that the projection engages the two workpieces, and the two workpieces and the friction stir welding tool are moved relative to each other so as to intermittently weld the two workpieces along the joint interface by use of the projection for provisional joining; and subsequently performing main friction stir welding in such a manner that, while the rotor of the friction stir welding tool is rotated, the probe is plunged into the joint interface such that the probe engages the two workpieces, and the two workpieces and the friction stir welding tool are moved relative to each other so as to continuously weld the two workpieces along the entire joint interface by use of the probe.

2. The friction stir welding method according to claim 1, wherein a relation $(L1-0.05) \leq Z \leq (L1+0.15)$ is satisfied when the provisional friction stir welding is performed, and a relation $(L2-0.05) \leq Z \leq (L2+0.3)$ is satisfied when the main friction stir welding is performed, where L1 represents a length (mm) of the projection for provisional joining, L2 represents a total length (mm) of the probe and the projection for provisional joining, and Z represents a plunged depth (mm) of the distal end of the projection for provisional joining as measured from the surfaces of the workpieces.

3. The friction stir welding method according to claim 1, wherein each of joined portions formed by the provisional friction stir welding has length equal to or greater than the diameter of the distal end surface of the probe of the friction stir welding tool.

4. The friction stir welding method according to claim 1, wherein the joint interface between the two workpieces is straight, and the provisional friction stir welding is performed such that each of unjoined portions has a length equal to or less than 300 mm.

5. The friction stir welding method according to claim 1, wherein the joint interface between the two workpieces includes an arcuate portion, and the provisional friction stir welding is performed such that each of unjoined portions has a length equal to or less than three times the radius of the arcuate portion.

6. The friction stir welding method according to claim 5, wherein the joint interface between the two workpieces has an endless shape.

7. The friction stir welding method according to claim 1, wherein the projection for provisional joining has a length of 0.3 to 2 mm.

8. The friction stir welding method according to claim 1, wherein the distal end surface of the probe is a flat surface or a partial-spherical concave surface.

9. The friction stir welding method according to claim 1, wherein the probe has a cylindrical columnar shape.

10. The friction stir welding method according to claim 1, wherein the probe has a conical shape so that the diameter of the probe decreases toward the distal end thereof.

11. The friction stir welding method according to claim 1, wherein a thread ridge is formed on an outer circumferential surface of the probe, and is not formed on an outer circumferential surface of the projection for provisional joining.

12. The friction stir welding method according to claim 1, wherein a distal end surface of the projection for provisional joining is a partial-spherical convex surface.

13. The friction stir welding method according to claim 1, wherein the projection for provisional joining has a transverse cross section of an irregular shape, and has, on its outer circumferential surface, a plurality of partial cylindrical surfaces formed such that the partial cylindrical surfaces are located in a common cylindrical plane and separated from one another in the circumferential direction.

* * * * *